(12) United States Patent
Peitzer

(10) Patent No.: US 12,457,541 B2
(45) Date of Patent: Oct. 28, 2025

(54) LIMITING THE USE OF SIGNALS WITH A POTENTIALLY INTERFERING BAND BY USER EQUIPMENT OPERATED ABOVE GROUND LEVEL

(71) Applicant: AT&T INTELLECTUAL PROPERTY I, L.P., Atlanta, GA (US)

(72) Inventor: Haywood Peitzer, Randolph, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 238 days.

(21) Appl. No.: 17/875,259

(22) Filed: Jul. 27, 2022

(65) Prior Publication Data
US 2024/0040471 A1 Feb. 1, 2024

(51) Int. Cl.
*H04W 40/20* (2009.01)
*H04W 4/90* (2018.01)

(52) U.S. Cl.
CPC ........... *H04W 40/205* (2013.01); *H04W 4/90* (2018.02)

(58) Field of Classification Search
None
See application file for complete search history.

(56) References Cited

U.S. PATENT DOCUMENTS

| | | | |
|---|---|---|---|
| 7,245,908 B1* | 7/2007 | Weaver | H04W 48/04 455/430 |
| 8,195,199 B2* | 6/2012 | Dembski-Minssen | H04B 7/18506 455/420 |
| 10,084,566 B2* | 9/2018 | Bassow | H04J 13/0062 |
| 2015/0334646 A1* | 11/2015 | Buckley | H04W 48/18 455/432.1 |
| 2023/0134751 A1* | 5/2023 | Rahman | G01S 1/0428 455/452.1 |
| 2023/0209322 A1* | 6/2023 | Shrivastava | H04W 4/90 455/404.2 |
| 2023/0251157 A1* | 8/2023 | Gupta | G01C 5/06 702/98 |
| 2023/0292221 A1* | 9/2023 | Ozturk | H04W 24/08 |

* cited by examiner

*Primary Examiner* — Kenneth B Wells
(74) *Attorney, Agent, or Firm* — Guntin & Gust, PLC; Louis Yang

(57) ABSTRACT

The technologies described herein are generally directed to, based on a determination that a user equipment is operating from an airborne aircraft, limiting the use signals with potentially interfering bands in a fifth generation (5G) network or other next generation networks. For example, a method described herein can include receiving, via a communications network, altitude information corresponding to an altitude of a user equipment. Further, the method can include, based on the altitude, generating a signal limiting instruction applicable to limit a signal. The method can further include, communicating the signal limiting instruction to alter the signal associated with the user equipment with respect to a potentially interfering band.

20 Claims, 10 Drawing Sheets

LIMITING THE USE OF SIGNALS WITH A POTENTIALLY INTERFERING BAND BY USER EQUIPMENT OPERATED ABOVE GROUND LEVEL

TECHNICAL FIELD

The subject application is related to different approaches to handling wireless communication in networked computer systems and, for example, to limiting the use of certain bands by user equipment above ground level.

BACKGROUND

As network implementations have continued to increase in size and diversity, a variety of different bands are available for use by different wireless carriers. Problems can occur because some of these bands are thought by some to potentially interfere with the operation of certain aircraft systems. Addressing these assessments of potential interference can be challenging because of the variety of locations in which access points and user equipment can operate.

In some circumstances, for some bands, potential and actual interference has resulted an inability for wireless carriers to fully deploy spectrum.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
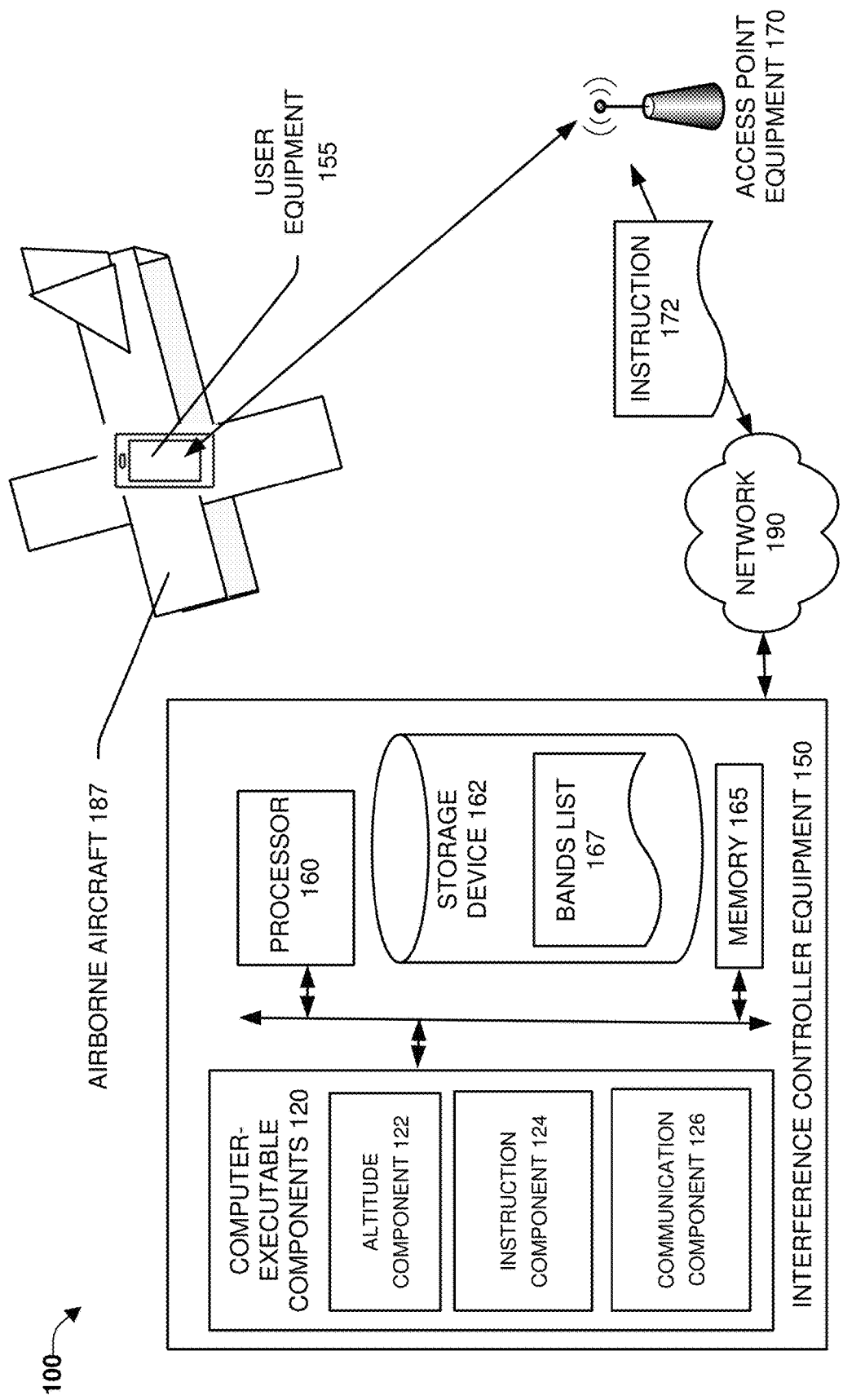
FIG. 1 is an architecture diagram of an example system that can facilitate, based on a determination that a user equipment is operating from an airborne aircraft, limiting the use signals with potentially interfering bands, in accordance with one or more embodiments.

Generally speaking, one or more embodiments of a system described herein can facilitate, based on a determination that a user equipment is operating from an airborne aircraft, limiting the use signals with potentially interfering bands. It is important to note that, as used herein, signals operating at 'potentially interfering bands' are not considered herein to have been established to be actually interfering with other signals in the different example circumstances discussed herein. One or more embodiments can operate to reduce or eliminate the potential for interference by these signals using different approaches.

In addition, one or more embodiments described herein can be directed towards a multi-connectivity framework that supports the operation of new radio (NR, sometimes referred to as 5G). As will be understood, by reducing the use of signals with some bands in some circumstances, one or more embodiments can provide benefits including, system robustness and increased confidence in the safety of the operation of the network.

It should be understood that any of the examples and terms used herein are non-limiting. For instance, while examples are generally directed to identifying potential interference by certain wireless communication bands with aircraft operations, it should be understood that it is straightforward to extend the technology described herein to other scenarios where interference can be caused by different signal bands. As such, any of the examples herein are non-limiting examples, any of the embodiments, aspects, concepts, structures, functionalities or examples described herein are non-limiting, and the technology may be used in various ways that provide benefits and advantages in radio communications in general.

In some embodiments, understandable variations of the non-limiting terms "signal propagation source equipment" or simply "propagation equipment," "radio network node" or simply "network node," "radio network device," "network device," and access elements are used herein. These terms may be used interchangeably and refer to any type of network node that can serve user equipment and/or be connected to other network nodes or network elements or any radio node from where user equipment can receive a signal. Examples of radio network nodes include, but are not limited to, base stations (BS), multi-standard radio (MSR) nodes such as MSR BS, gNode B (gNB), eNode B (cNB), network controllers, radio network controllers (RNC), base station controllers (BSC), relay, donor node controlling relay, base transceiver stations (BTS), access points (AP), transmission points, transmission nodes, remote radio units (RRU) (also termed radio units herein), remote ratio heads (RRH), and nodes in distributed antenna system (DAS). Additional types of nodes are also discussed with embodiments below, e.g., donor node equipment and relay node equipment, an example use of these being in a network with an integrated access backhaul network topology.

In some embodiments, understandable variations of the non-limiting term user equipment (UE) are used. This term can refer to any type of wireless device that can communicate with a radio network node in a cellular or mobile communication system. Examples of UEs include, but are not limited to, a target device, device to device (INSTRUCTION COMPONENTD) user equipment, machine type user equipment, user equipment capable of machine to machine (M2M) communication, PDAs, tablets, mobile terminals, smart phones, laptop embedded equipped (LEE), laptop mounted equipment (LME), USB dongles, and other equipment that can have similar connectivity. Example UEs are described further with FIGS. 9 and 10 below. Some embodiments are described in particular for 5G new radio systems. The embodiments are however applicable to any radio access technology (RAT) or multi-RAT system where the UEs operate using multiple carriers, e.g., LTE. Some embodiments are described in particular for 5G new radio systems. The embodiments are however applicable to any radio access technology (RAT) or multi-RAT system where the UEs operate using multiple carriers, e.g., LTE.

One having skill in the relevant art(s), given the disclosure herein understands that the computer processing systems, computer-implemented methods, equipment (apparatus) and/or computer program products described herein employ hardware and/or software to solve problems that are highly technical in nature (e.g., determining that some certain bands are to be limited in some circumstances), that are not abstract and cannot be performed as a set of mental acts by a human. For example, a human, or even a plurality of humans, cannot efficiently monitor use of complex user equipment signaling (e.g., MIMO operations) and alter the use of certain signals, with the same level of accuracy and/or efficiency as the various embodiments described herein.

Aspects of the subject disclosure will now be described more fully hereinafter with reference to the accompanying drawings in which example components, graphs and selected operations are shown. In the following description, for purposes of explanation, numerous specific details are set forth in order to provide a thorough understanding of the various embodiments. For example, some embodiments described can facilitate, based on a determination that a user equipment is operating from an airborne aircraft, limiting the use signals with potentially interfering bands. Different examples that describe these aspects are included with the description of FIGS. 1-10 below. It should be noted that the subject disclosure may be embodied in many different forms and should not be construed as limited to this example or other examples set forth herein.

FIG. 1 is an architecture diagram of an example system 100 that can facilitate, based on a determination that a user equipment is operating from an airborne aircraft, limiting the use of signals with potentially interfering bands, in accordance with one or more embodiments. For purposes of brevity, description of like elements and/or processes employed in other embodiments is omitted. As depicted, system 100 includes interference controller equipment 150 providing instruction 172 to airborne user equipment 155 via network 190 and access point equipment 170.

Airborne user equipment 155 is depicted as operating in airborne aircraft 187. As is discussed further herein, airborne aircraft 187 is a non-limiting example of a location where a user equipment can be operated substantially above ground level, e.g., by a drone with mobile connectivity, an aircraft such as a helicopter or airplane, a structure (e.g., a building) where a user equipment is operated.

Interference controller equipment 150 can include computer executable components 120, processor 160, storage device 162 and memory 165. Computer executable components 120 can include altitude component 122, instruction component 124, communication component 126, and other components described or suggested by different embodiments described herein, that can improve the operation of system 100.

Storage device 162 can include bands list 167, which, in different implementations, can include a subset of available bands in serving sites of the communications network. This subset can include bands that can potentially interfere with other signals in a particular area. Nonlimiting examples of bands list 167 used by one or more embodiments described herein can include bands that can interfere with the operation of aircraft, e.g., some of the so-called C-band spectrum is thought by some analysts to have the potential to interfere with the operation of some instruments of large airplanes, e.g., radio altimeter operation. As 5G operation becomes more prevalent, the new bands used by 5G MIMO devices represent new potentially interfering bands to be handled by one or more embodiments.

Different areas that can be covered in bands list 167 as potentially interfering with other signals include user equipment operating at altitudes where their signal is spread beyond the normal distribution of ground-based user equipment, e.g., when a user equipment (or a drone with UE capabilities) is operating from an altitude comparable to a base station tower, the user equipment can broadcast signals to a wide area like the base station tower.

In one or more embodiments, bands list can be pre-loaded and relatively static, or dynamically altered based on analysis of usage data, e.g., adjusted based on artificial intelligence, such as is discussed with FIG. 5 below. In other embodiments discussed below, bands list 167 can be stored and utilized by individual UEs 155.

Further to the above, it should be appreciated that these components, as well as aspects of the embodiments of the subject disclosure depicted in this figure and various figures disclosed herein, are for illustration only, and as such, the architecture of such embodiments are not limited to the systems, devices, and/or components depicted therein. For example, in some embodiments, interference controller equipment 150 can further include various computer and/or computing-based elements described herein with reference to mobile handset 900 of FIG. 9, and operating environment 1000 of FIG. 10. For example, one or more of the different functions of network equipment can be divided among various equipment, including, but not limited to, including equipment at a central node global control located on the core network, e.g., mobile edge computing (MEC), self-organized networks (SON), or RAN intelligent controller (RIC) network equipment.

In some embodiments, memory 165 can include volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 165 are described below with reference to system memory 1006 and FIG. 10. Such examples of memory 165 can be employed to implement any embodiments of the subject disclosure.

According to multiple embodiments, storage device 162 can include, but is not limited to, RAM, ROM, EEPROM, flash memory or other memory technology, solid state drive (SSD) or other solid-state storage technology, Compact Disk Read Only Memory (CD ROM), digital video disk (DVD), blu-ray disk, or other optical disk storage, magnetic cassettes, magnetic tape, magnetic disk storage or other magnetic storage devices, or any other medium which can be used to store the desired information and which can be accessed by the computer.

According to multiple embodiments, processor 160 can include one or more processors and/or electronic circuitry that can implement one or more computer and/or machine readable, writable, and/or executable components and/or instructions that can be stored in memory 165. For example, processor 160 can perform various operations that can be specified by such computer and/or machine readable, writable, and/or executable components and/or instructions including, but not limited to, logic, control, input/output (I/O), arithmetic, and/or the like. In some embodiments, processor 160 can include one or more components including, but not limited to, a central processing unit, a multi-core processor, a microprocessor, dual microprocessors, a microcontroller, a system on a chip (SOC), an array processor, a vector processor, and other types of processors. Further examples of processor 160 are described below with reference to processing unit 1004 of FIG. 10. Such examples of processor 160 can be employed to implement any embodiments of the subject disclosure.

In one or more embodiments, computer executable components 120 can be used in connection with implementing one or more of the systems, devices, components, and/or computer-implemented operations shown and described in connection with FIG. 1 or other figures disclosed herein. For example, in one or more embodiments, computer executable components 120 can include instructions that, when executed by processor 160, can facilitate performance of operations defining altitude component 122. As discussed below, altitude component 122 can, in accordance with one or more embodiments, receive, via a communications network, altitude information corresponding to an altitude of a user equipment. For example, one or more embodiments can receive, via a communications network, altitude information from user equipment to an altitude measurement corresponding to the altitude of user equipment 155.

Further, in another example, in one or more embodiments, computer executable components 120 can include instructions that, when executed by processor 160, can facilitate performance of operations defining instruction component 124. As discussed with FIGS. 3-4 below, instruction component 124 can, in accordance with one or more embodiments, based on the altitude, generate a signal limiting instruction applicable to limit a signal. For example, in different implementations, one or more embodiments can, based on the altitude of user equipment 155, generate a signal limiting instruction 172 applicable to limit a signal, e.g., signals used by user equipment 155 and, in alternative or additional embodiments, signals used by access point equipment 170.

In yet another example, computer executable components 120 can include instructions that, when executed by processor 160, can facilitate performance of operations defining communication component 126. As discussed herein, in one or more embodiments, communication component 126 can communicate the signal limiting instruction to alter the signal associated with the user equipment with respect to a potentially interfering bands. For example, one or more embodiments can communicate the signal limiting instruction 172 to alter the signal associated with the user equipment with respect to a potentially interfering bands, as specified by bands list 167 discussed above.

Figure 2:
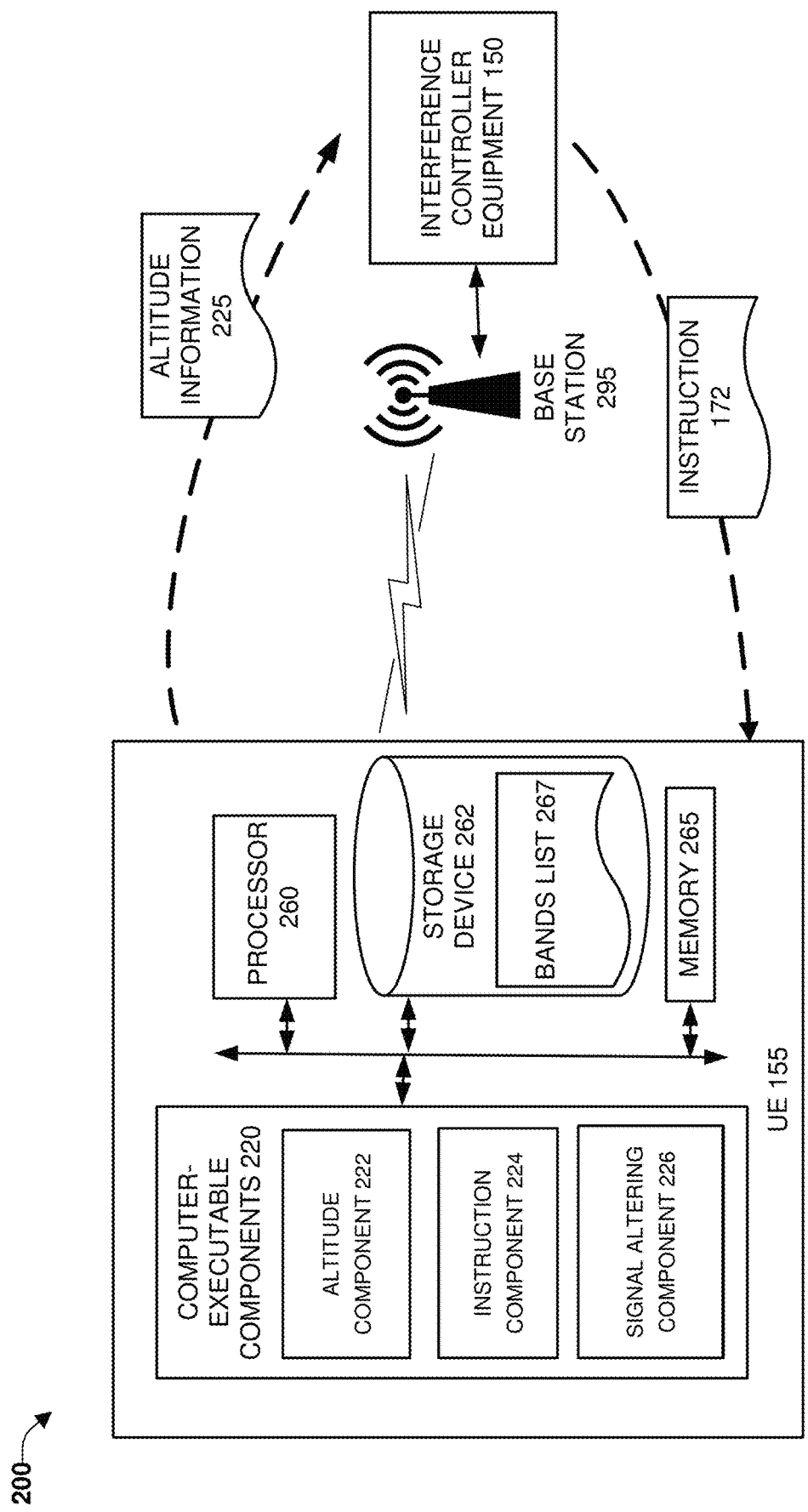
FIG. 2 is a diagram of a non-limiting example system that can facilitate, based on a determination that a user equipment is operating from a selected altitude, limiting the use signals with potentially interfering bands, in accordance with one or more embodiments.

FIG. 2 is a diagram of a non-limiting example system 200 that can facilitate, based on a determination that a user equipment is operating from a selected altitude, limiting the use of signals with potentially interfering bands, in accordance with one or more embodiments. For purposes of brevity, description of like elements and/or processes employed in other embodiments is omitted.

As depicted, system 200 can include UE 155 connected to interference controller equipment 150 via base station 295. In one or more embodiments, UE 155 can include memory 265 that can store one or more computer and/or machine readable, writable, and/or executable components and/or instructions 220 that, when respectively executed by processor 260, can facilitate performance of operations defined by the executable component(s) and/or instruction(s).

In system 200, computer executable components 220 can include altitude component 212, instruction component 214, signal altering component 216, and other components described or suggested by different embodiments described herein that can improve the operation of system 200. For example, in some embodiments, UE 155 can further include various computer and/or computing-based elements described herein with reference to mobile handset 900 of FIG. 9 and operating environment 1000 described with FIG. 10.

In one or more embodiments, computer executable components 220 can be used in connection with implementing one or more of the systems, devices, components, and/or computer-implemented operations shown and described in connection with FIG. 2 or other figures disclosed herein. In one or more embodiments, computer executable components 220 can include instructions that, when executed by processor 260, can facilitate performance of operations defining altitude component 212. As discussed below, in one or more embodiments, altitude component 212 can identify an altitude of the user equipment. Example ways that UE 155 can determine an altitude of the UE is using one or more of, satellite-based navigation (e.g., global positioning system (GPS)) barometer, WiFi AP, or 5G beam (SSB). In some examples used herein, altitude can be termed 'Z-axis elevation." Another source of Z-level measurements can be identified by the Z axis elevation value produced.

In another example, in one or more embodiments, computer executable components 220 can include instructions that, when executed by processor 260, can facilitate performance of operations defining instruction component 214. As discussed below, instruction component 214 can, in accordance with one or more embodiments, identify an instruction that is related to one or more signal bands, with the instruction being generated based on a determination, based on the altitude, that a signal of the signal bands has at least a threshold likelihood of interfering with a modality of transport.

In another example, in one or more embodiments, computer executable components 220 can include instructions that, when executed by processor 260, can facilitate performance of operations defining signal altering component 216. As discussed below, instruction component 216 can, in accordance with one or more embodiments, based on the instruction, alter use of the signal bands for transmission by the user equipment. In an example, based on the altitude of UE 155 and bands list 167, interference controller equipment 150 can alter the use of certain bands by UE 155, e.g., by instruction 172.

Figure 3:
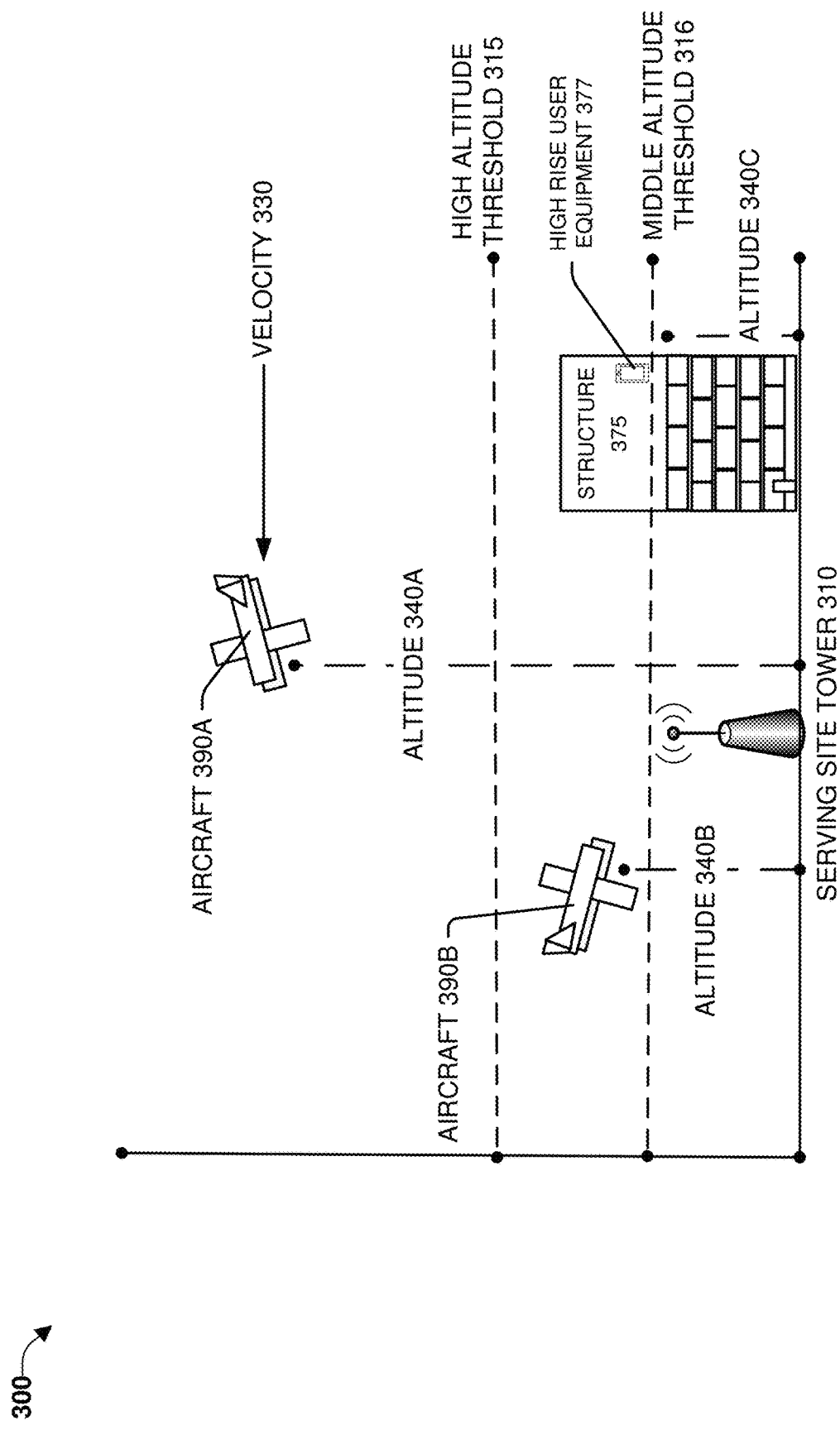
FIG. 3 is a diagram of a non-limiting example system that can facilitate, based on a determination that a user equipment is operating at different threshold altitudes, limiting the use signals with potentially interfering bands, in accordance with one or more embodiments.
Figure 4:
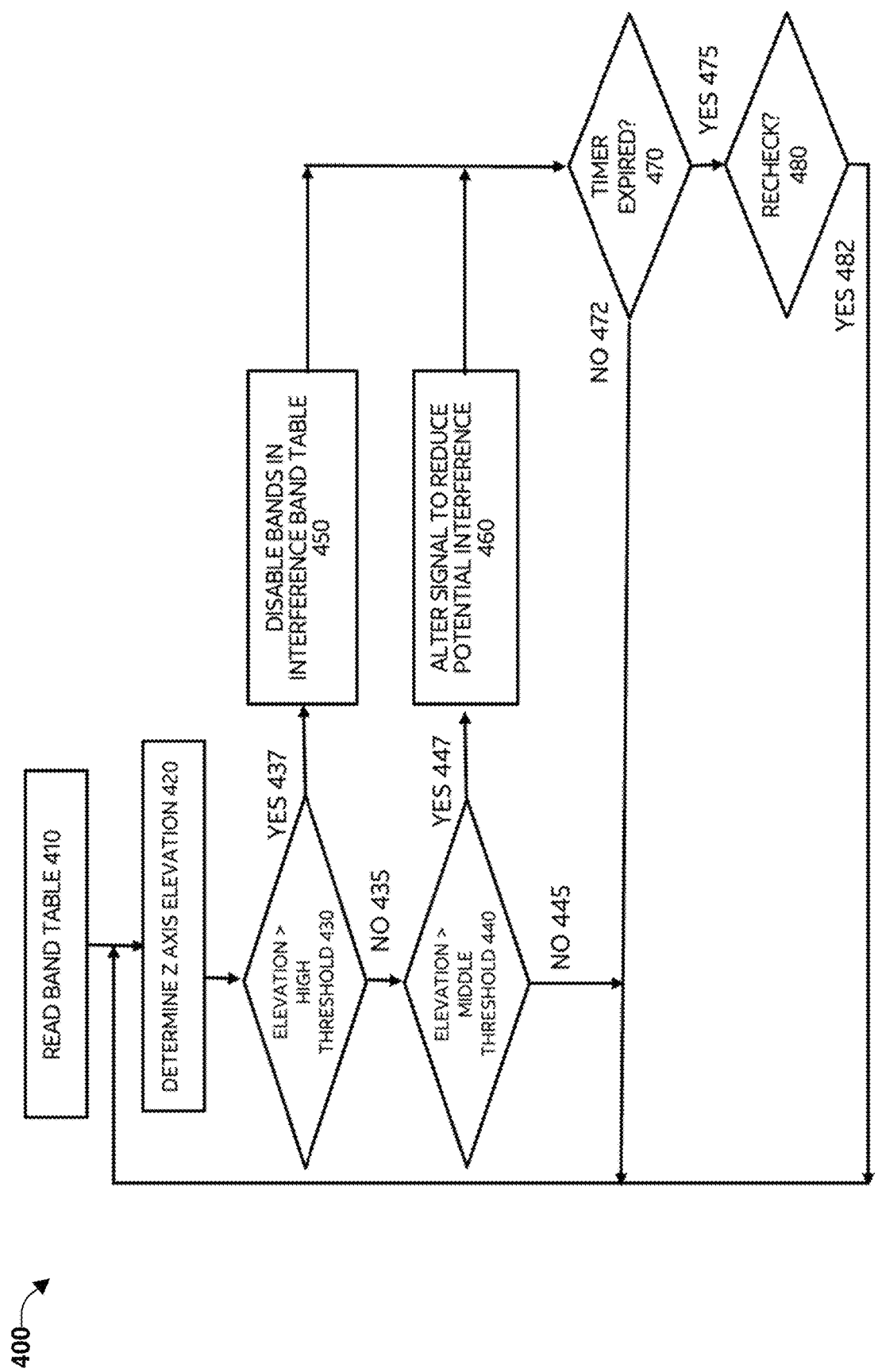
FIG. 4 is a diagram of a non-limiting example flowchart that can facilitate, based on a determination that a user equipment is operating at different threshold altitudes, limiting the use signals with potentially interfering bands, in accordance with one or more embodiments.

FIGS. 3 and 4 are respectively a diagram of a non-limiting example system 300 and a flowchart 400 that can facilitate, based on a determination that a user equipment is operating at different threshold altitudes, limiting the use of signals with potentially interfering bands, in accordance with one or more embodiments. For purposes of brevity, description of like elements and/or processes employed in other embodiments is omitted.

As depicted, system 300 shows aircraft 390A-B operating at altitudes 340A-B respectively, with example UEs on board (not shown). Structure 375 includes high-rise user equipment 377 operating at altitude 340C. Aircraft 390A is depicted as operating above high-altitude threshold 315 and both aircraft 390B and high-rise user equipment 377 are depicted operating between medium altitude threshold 316 and high-altitude threshold 315. Serving site tower 310 is depicted as having a transmission element operating below medium altitude threshold 316.

At 410, the bands list can be read to facilitate analysis of the potential interference. As noted above, this table can be specific to a particular area, and describes not only particular bands that have the potential to interfere with other signals, but also parameters to apply to limit the potential interference of the listed bands when using the bands is permitted.

At 420, Z axis elevation (e.g., altitude above sea level) 420 is determined. As noted above, one approach to determining the transmitting altitude of a user equipment is to use the GPS capabilities of the user equipment to determine the altitude. As noted, the development of enhanced emergency calling (e.g., 911) capabilities has improved this altitude estimate (e.g., also termed Z axis elevation) for some devices.

As noted with FIG. 2 above, in one or more embodiments, UE 155 can determine different actions to take to avoid the described interference without the need to receive instruction 172 from interference controller equipment 150. This capability is available to one or more embodiments to handle times when UE 155 cannot establish a connection with the network, but still retains the capability to transmit in interfering bands, e.g., potentially making repeated transmissions to attempt to locate the network.

One way that altitude component 222 can estimate the altitude of UE 155 is by using the GPS of UE 155 to identify altitude and velocity. In some circumstances, however, because of certain circumstances (e.g., being inside of airborne aircraft 190A-B), an accurate GPS signal is not available. In these circumstances, other user device sensors (e.g., discussed with FIG. 9 below) can be used to identify that UE 155 is airborne in an airplane, e.g., the accelerometer and gyroscope of UE 155 can identify the pattern of velocity, acceleration, periodic weightlessness, and turning forces associated with traveling in an aircraft.

Another way that one or more embodiments can facilitate UE 155 determining an airborne status (e.g., without a network connection or GPS signal) is to detect signals from high altitude signal sources that have characteristics associated with a high-altitude receiver receiving a signal transmitted at a high altitude. Example characteristics include UE 155 detecting several network serving sites (e.g., serving site tower 310) at strong signal levels and low reference signal received quality. UE 155 can interpret these characteristics as evidence that the signals have arrived at line-of-sight propagation, e.g., instead of being received at ground level with Rayleigh scattering. One or more embodiments can determine elevation of user equipment by identifying that the UE has received line-of-sight transmissions from a tower at an example two-hundred (200) foot height.

In one or more embodiments, high-rise user equipment 377 is being operated from structure 375. One or more embodiments can use one or more of the other approaches described herein to determine that the high-rise user equipment is at a height where interference can cause problems.

Another approach that can be used to determine the interference potential of UE 155 is by configuring an aircraft to emit positioning information with a repeater/transmitter that is internal to the aircraft, e.g., GPS, WiFi, Femto. In this circumstance, instead of GPS or interference controller equipment 150 connectivity, one or more embodiments can receive information broadcast by the aircraft that provides interference potential information, e.g., the position notifier can be integrated with avionics (i.e., radio altimeter) so that UE 155 can be disabled from C band while certain aircraft instruments are in use.

At 430, the determined altitude is compared to a high-altitude threshold 315. In some circumstances, high-altitude threshold 315 can be set to a distance above which interference would likely be so significant that use of potentially interfering bands is set to be preemptively disabled 450, e.g., before use of the bands, and before notice or detection of any interference by signals of the bands. In an example implementation, this high-altitude threshold is two hundred (200) feet above sea level, an example aircraft 190A depicted as operating above this threshold.

Alternatively, when the elevation is not above high-altitude threshold 315 (e.g., 435) a middle threshold value is compared to the altitude. In one or more embodiments, because of the lower potential interference from the identified bands, transmission of signals with these bands is not disabled. Instead, the transmission is altered, e.g., to reduce the potential of interference based on the altitude by issuing an instruction 172 that can limit the potential for interference. In an example, the instruction 172 used to limit the potential for interference is a power instruction that can reduce a transmission power of the transmission of the signal using the potentially interfering bands. In another example instruction 172, the instruction can be an interval instruction that reduces a transmission time interval (TTI) allocated to the user equipment for the transmission of the signal using the potentially interfering bands. In yet another example, instruction 172 can limit the potential by reducing a size of a physical resource block (PRB) allocated for the transmission of the signal using the potentially interfering bands. One having skill in the relevant art(s), given the description herein, appreciates that other approaches can be implemented in 5G and LTE radio access technologies to reduce the likelihood of interference in circumstances described herein.

At 470, a timer can be checked to determine whether an interference check can be paused (e.g., to save battery, if needed). If, at 475, this timer has expired then a check is made to determine whether a recheck 480 is selected.

Figure 5:
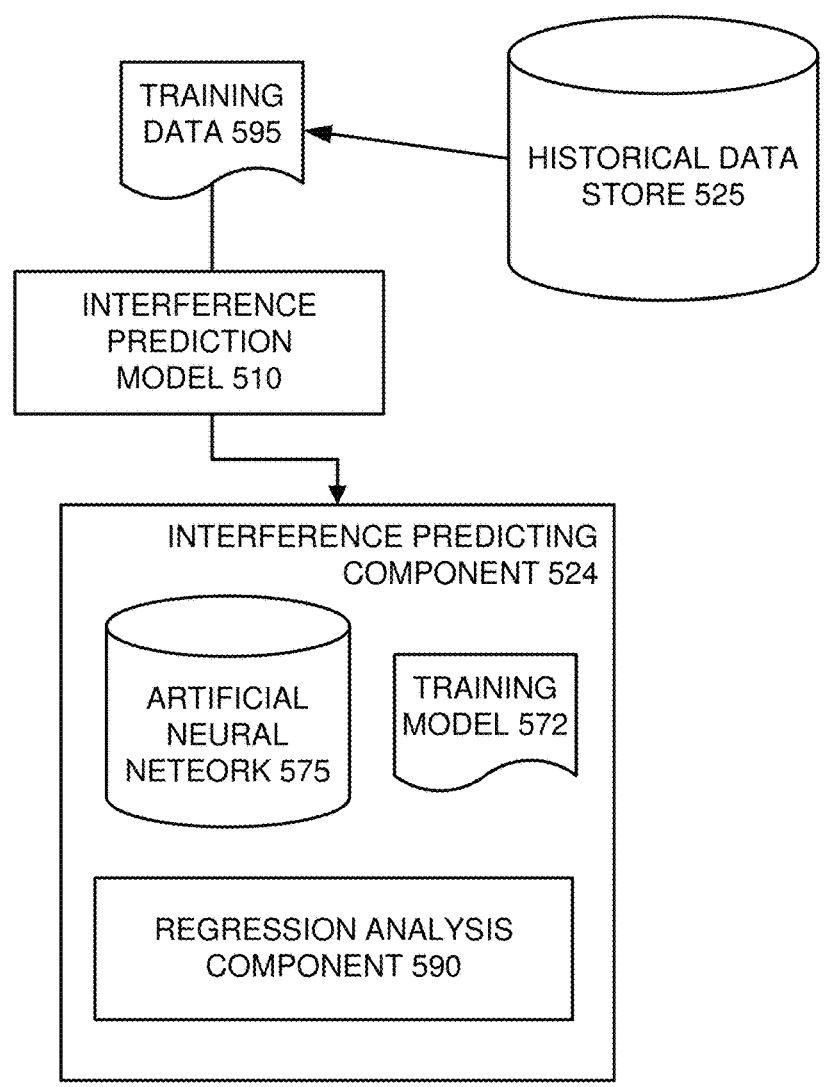
FIG. 5 illustrates an implementation of an example, non-limiting system that can facilitate, based on a determination that a user equipment is operating at different threshold altitudes, limiting the use signals with potentially interfering bands, in accordance with one or more embodiments.

FIG. 5 illustrates an implementation of an example, non-limiting system 500 that can facilitate, based on a determination that a user equipment is operating at different threshold altitudes, limiting the use of signals with potentially interfering bands, by approaches comprising those described by examples below. Repetitive description of like elements and/or processes employed in respective embodiments is omitted for sake of brevity.

As depicted, system 500 can include interference prediction component 524, historical data store 525, training data 595, and interference prediction model 510. Interference prediction component 524 in this example can include artificial neural network (ANN) 575, ANN training model 572, and regression analysis component 590.

In certain embodiments, different functions of interference predicting component 524 can be facilitated based on classifications, correlations, inferences and/or expressions associated with principles of artificial intelligence and machine learning. For example, interference predicting component 524 can employ expert systems, fuzzy logic, SVMs, Hidden Markov Models (HMMs), greedy search algorithms, rule-based systems, Bayesian models (e.g., Bayesian networks), ANNs, other non-linear training techniques, data fusion, utility-based analytical systems, systems employing Bayesian models, and ensemble ML algorithms/methods, comprising deep neural networks (DNN), reinforcement learning (RL), Bayesian Statistics, long short-term memory (LSTM) networks. One or more of the above approaches can be specified in capacity prediction model 510 and can be used by capacity prediction component 370 to analyze one or more sources of network usage information discussed above.

In an example embodiment, the historical data store 525 can be included in information stored in ANN 575, that was trained by historical information associated with the interference controller equipment 150. In additional embodiments, initial and subsequent training of ANN 575 can be based on collected production data stored in historical data store 525 that has been divided into training data 595 in a first data portion and optimizing data (e.g., testing, validation) in a second portion of data. In different approaches, these portions can be selected based on different approaches that can include, but are not limited to, a random or pseudorandom selection process.

As would be appreciated by one having skill in the relevant art(s), given the description herein, different aspects of network data records (e.g., results of one or more embodiments with respect to interference by certain bands) can be used to train ANN 575. Example values that can be assessed can include bands utilization, quality of service metrics such as key performance indicators (KPIs) and key quality indicators (KQI), performance and configuration data collected by UE/eNodeB, along with different scenarios of interference detected and reported.

As would be appreciated by one having skill in the relevant art(s), given the description herein, after training by the first portion of data, the second portion of data, analysis results for the data, can be used to validate and update ANN 575, if needed. It should be noted that this description of employing an ANN is non-limiting, e.g., one or more embodiments can use other types of artificial intelligence and machine learning algorithms that receive input and perform capacity analysis as described above.

In another approach, machine learning (supervised learning) based solutions can be used to analyze the types of data described above to generate predicted interference by different bands. As would be appreciated by one having skill in the relevant art(s), given the description herein, regression analysis component 590 can be used to apply a regression analysis approach to machine learning for embodiments, e.g., this approach is useful in some circumstances for analyzing data to generate different improved solutions to a problem.

Figure 6:
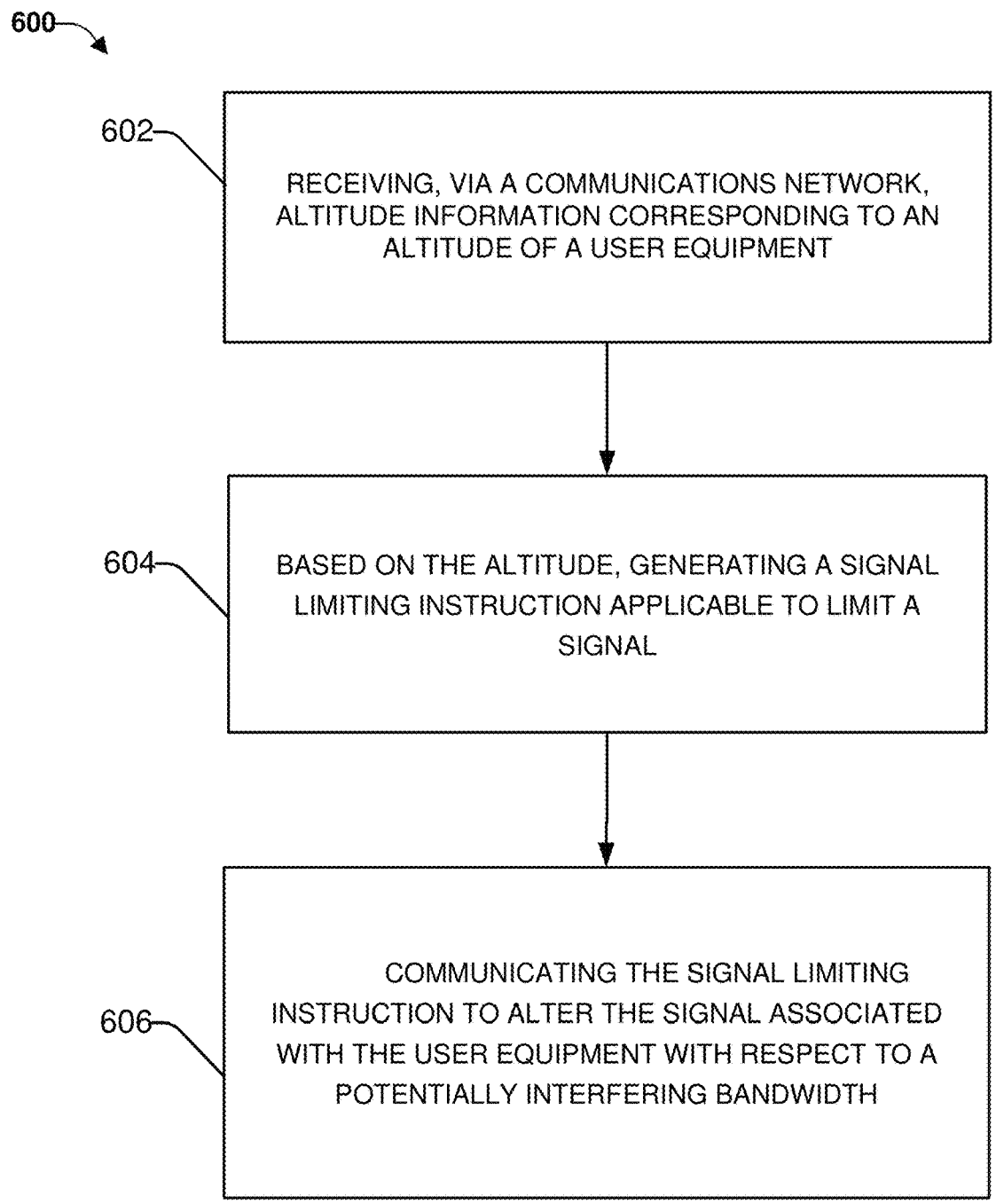
FIG. 6 illustrates an example method that can facilitate, based on a determination that a user equipment is operating from an airborne aircraft, limiting the use signals with potentially interfering bands, in accordance with one or more embodiments.

FIG. 6 illustrates an example method 600 that can facilitate, based on a determination that a user equipment is operating from an airborne aircraft, limiting the use of signals with potentially interfering bands, in accordance with one or more embodiments. For purposes of brevity, description of like elements and/or processes employed in other embodiments is omitted.

At 602, method 600 can include receiving, via a communications network, altitude information corresponding to an altitude of a user equipment. For example, one or more embodiments can receive, via a communications network 190, altitude information corresponding to an altitude 340B of a user equipment in aircraft 390B. At 604, method 600 can include, based on the altitude, generating a signal limiting instruction applicable to limit a signal. For example, one or more embodiments can, based on the altitude, generate a signal limiting instruction applicable to limit a signal of the user equipment in aircraft 390B. At 606, method 600 can include communicating the signal limiting instruction to alter the signal associated with the user equipment with respect to potentially interfering bands. For example, one or more embodiments can communicate the signal limiting instruction to alter the signal associated with the user equipment with respect to a potentially interfering bands (e.g., a C-band signal).

In alternative or additional embodiments, communicating the signal can include communicating the signal limiting instruction to the user equipment, and responsive to receiving the signal limiting instruction, the user equipment operates to limit a transmission of the signal of the user equipment.

In alternative or additional embodiments, communicating the signal can include communicating the signal limiting instruction to an access point of the communications network, and, responsive to receiving the signal limiting instruction, the access point can operate to limit a transmission of the signal to the user equipment.

In alternative or additional embodiments, the signal limiting instruction can include a band muting instruction that can cause the user equipment not to transmit the signal using the potentially interfering bands.

In alternative or additional embodiments, the band muting instruction can be based on the altitude being determined to be above a high-altitude threshold selected to identify the user equipment as being in an aircraft at a threshold high altitude.

In alternative or additional embodiments, the potentially interfering bands can be identified as potentially interfering with operation of an aircraft.

In alternative or additional embodiments, the method can further include, based on the altitude and a velocity of the user equipment, determining, by the routing controller equipment, that the user equipment can be located at the altitude in a structure.

In alternative or additional embodiments, the method can further include, based on the altitude and a velocity of the user equipment, determining, by the routing controller equipment, that the user equipment can be located in an aircraft that is airborne.

In alternative or additional embodiments, based on the user equipment being determined to be airborne and the altitude being determined to be below a threshold high altitude threshold, determining that the user equipment is in an airborne aircraft traveling at a medium altitude and, based on the user equipment being determined to be in the airborne aircraft traveling at the medium altitude, with the signal limiting instruction including an instruction that permits transmission of the signal using the potentially interfering bands, and limits a potential for interference caused by the signal using the potentially interfering bands.

In alternative or additional embodiments, the instruction that limits the potential for interference can include a power instruction that reduces a transmission power of the transmission of the signal using the potentially interfering bands.

In alternative or additional embodiments, the instruction that limits the potential for interference can include an interval instruction that reduces a transmission time interval allocated to the user equipment for the transmission of the signal using the potentially interfering bands. In alternative or additional embodiments, the instruction that limits the potential for interference can include a size instruction that reduces a size of a physical resource block allocated for the transmission of the signal using the potentially interfering bands.

In alternative or additional embodiments, the altitude was identified based on an enhanced emergency call information procedure.

In alternative or additional embodiments, the altitude was identified based on a measurement by a component of the user equipment.

Figure 7:
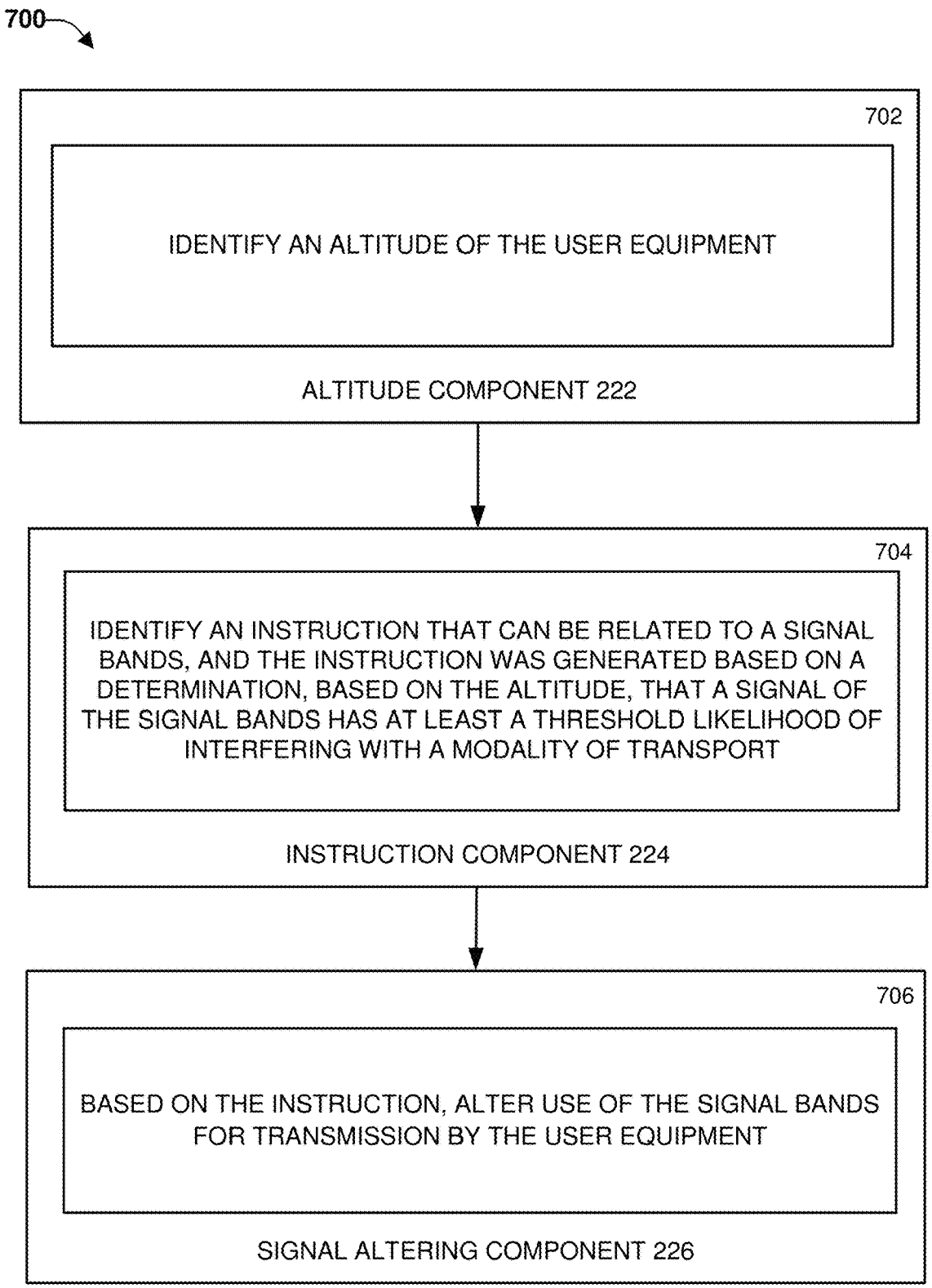
FIG. 7 depicts a system that can facilitate, based on a determination that a user equipment is operating from an airborne aircraft, limiting the use signals with potentially interfering bands, in accordance with one or more embodiments.

FIG. 7 depicts a system 700 that can facilitate, based on a determination that a user equipment is operating from an airborne aircraft, limiting the use of signals with potentially interfering bands, in accordance with one or more embodiments. For purposes of brevity, description of like elements and/or processes employed in other embodiments is omitted. As depicted, system 700 can include altitude component 222, instruction component 224, signal altering component 226, and other components described or suggested by different embodiments described herein, that can improve the operation of system 700.

In an example, component 702 can include the functions of altitude component 222, supported by the other layers of system 700. For example, component 702 can identify an altitude of the user equipment.

In this and other examples, component 704 can include the functions of instruction component 224, supported by the other layers of system 700. Continuing this example, in one or more embodiments, component 704 can identify an instruction that can be related to signal bands, and the instruction was generated based on a determination, based on the altitude, that a signal of the signal bands has at least a threshold likelihood of interfering with a modality of transport.

In an example, component 706 can include the functions of signal altering component 226, supported by the other layers of system 700. For example, component 706 can, based on the instruction, alter use of the signal bands for transmission by the user equipment.

In additional or alternative embodiments, the instruction was generated by network equipment based on an estimate that the user equipment can be traveling in an aircraft that is airborne, and, based on the instruction, a degree of altering the use of the signal bands can be based on the altitude of the user equipment.

Additional or alternative embodiments can further include receiving a list of signal bands that have a likelihood of interfering with the modality of transport, and based on the altitude and the list, generating the instruction to control a transmission resource of the user equipment to mitigate or eliminate potential interference based on the signal bands.

Figure 8:
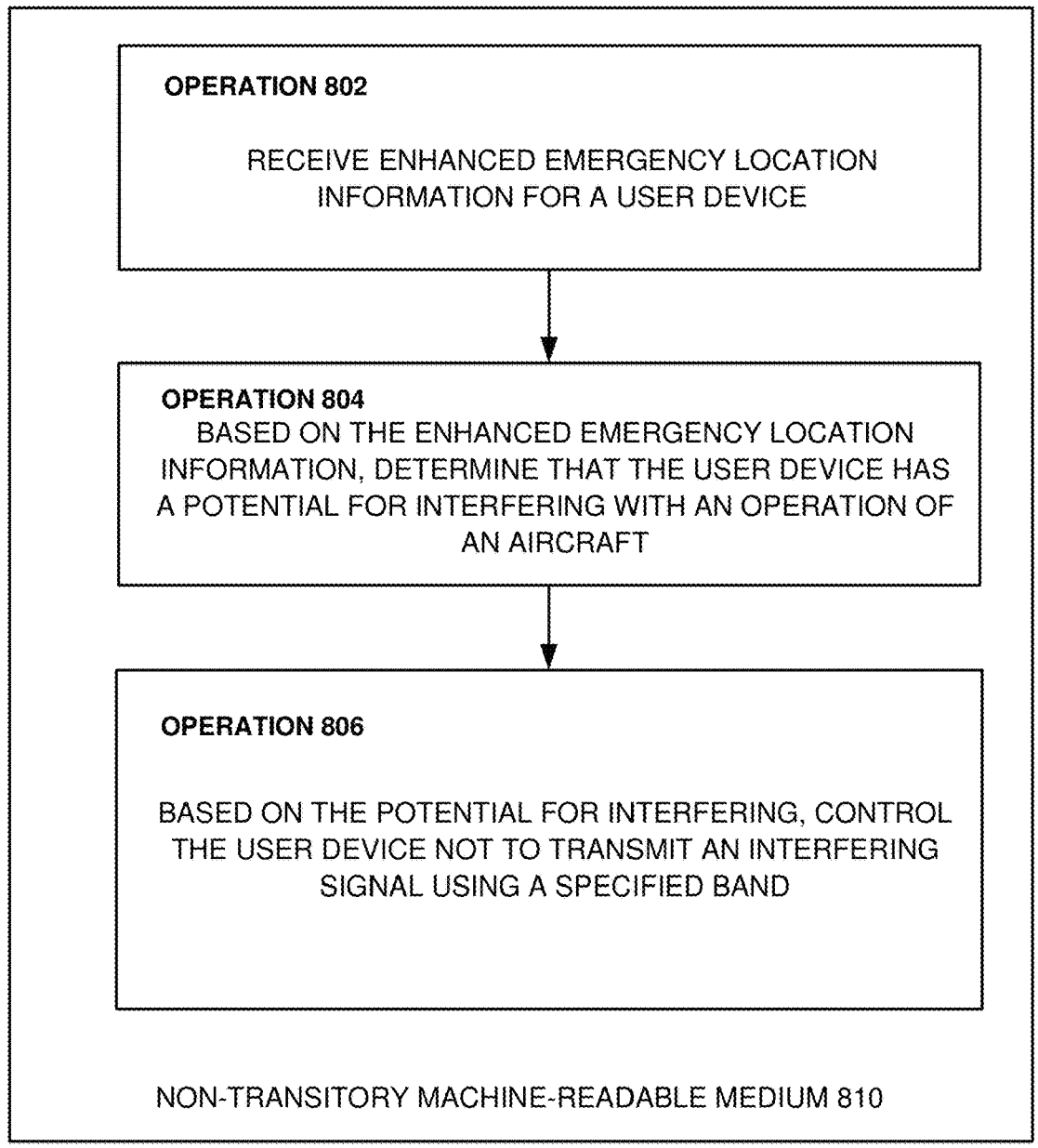
FIG. 8 depicts an example non-transitory machine-readable medium that can include executable instructions that, when executed by a processor of a system, facilitate, based on a determination that a user equipment is operating from an airborne aircraft, limiting the use signals with potentially interfering bands, in accordance with one or more embodiments described above.

FIG. 8 depicts an example 800 non-transitory machine-readable medium 810 that can include executable instructions that, when executed by a processor of a system, facilitate, based on a determination that a user equipment can be operating from an airborne aircraft, limiting the use of signals with potentially interfering bands, in accordance with one or more embodiments described above. For purposes of brevity, description of like elements and/or processes employed in other embodiments is omitted. As depicted, non-transitory machine-readable medium 810 includes executable instructions that can facilitate performance of operations 802-808.

In one or more embodiments, the operations can include operation 802 that can receive enhanced emergency location information for a user device.

Operations can further include operation 804, that can, based on the enhanced emergency location information, determine that the user device has a potential for interfering with an operation of an aircraft.

Operations can further include operation 806 that can, based on the potential for interfering, control the user device not to transmit an interfering signal using a specified band.

In additional or alternative embodiments, enhanced emergency location information can include an altitude of the user device from enhanced 911 information describing the user device.

Additional or alternative embodiments can include operations to determine that a signal is not the interfering signal based on a determination that the signal was transmitted using the specified band at a lower transmission power.

Figure 9:
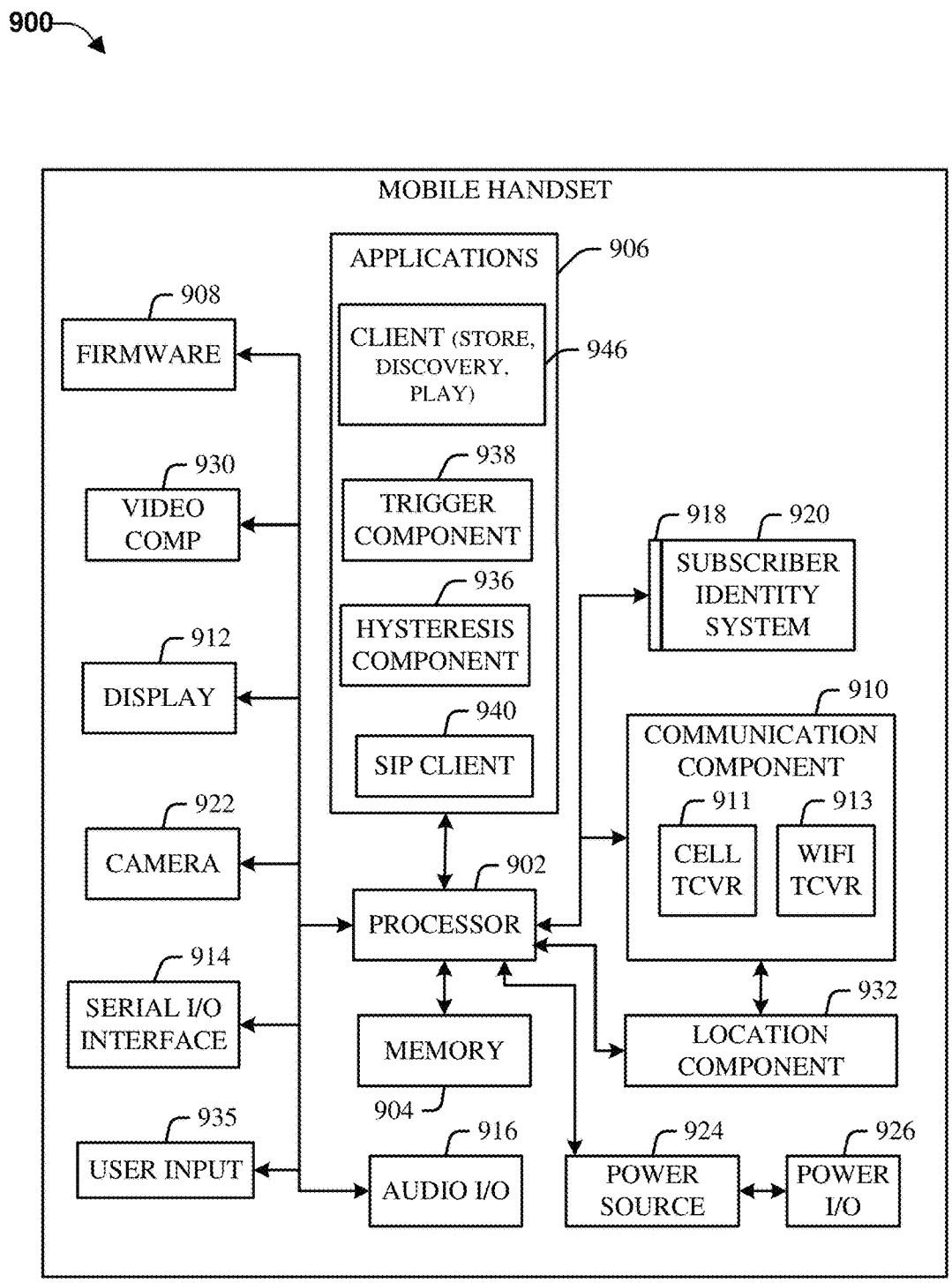
FIG. 9 illustrates an example block diagram of an example mobile handset operable to engage in a system architecture that can facilitate processes described herein, in accordance with one or more embodiments.

FIG. 9 illustrates an example block diagram of an example mobile handset 900 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per sc.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The handset includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VOIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1294) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card SIM or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communications component 910 to accommodate IP traffic from an IP network such as, for example, the Internet, a corporate intranet, a home network, a personal area network, etc., through an ISP or broadband cable provider. Thus, VOIP traffic can be utilized by the handset 900 and IP-based multimedia content can be received in either an encoded or a decoded format.

A video processing component 922 (e.g., a camera) can be provided for decoding encoded multimedia content. The video processing component 922 can aid in facilitating the generation, editing, and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and storage of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Network 190 can employ various cellular systems, technologies, and modulation schemes to facilitate wireless radio communications between devices. While example embodiments include use of 5G new radio (NR) systems, one or more embodiments discussed herein can be applicable to any radio access technology (RAT) or multi-RAT system, including where a user equipment operates using multiple carriers, e.g., LTE FDD/TDD, GSM/GERAN, CDMA2000, etc. For example, wireless communication system 200 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the user equipment. The term carrier aggregation (CA) is also called (e.g., interchangeably called) "multi-carrier system", "multi-cell operation", "multi-carrier operation", "multi-carrier" transmission and/or reception. Note that some embodiments are also applicable for Multi RAB (radio bearers) on some carriers (that is, data plus speech is simultaneously scheduled).

Various embodiments described herein can be configured to provide and employ 5G wireless networking features and functionalities. With 5G networks that may use waveforms that split the bands into several sub bands, different types of services can be accommodated in different sub bands with the most suitable waveform and numerology, leading to improved spectrum utilization for 5G networks. Notwithstanding, in the mmWave spectrum, the millimeter waves have shorter wavelengths relative to other communications waves, whereby mm Wave signals can experience severe path loss, penetration loss, and fading. However, the shorter wavelength at mmWave frequencies also allows more antennas to be packed in the same physical dimension, which allows for large-scale spatial multiplexing and highly directional beamforming.

Figure 10:
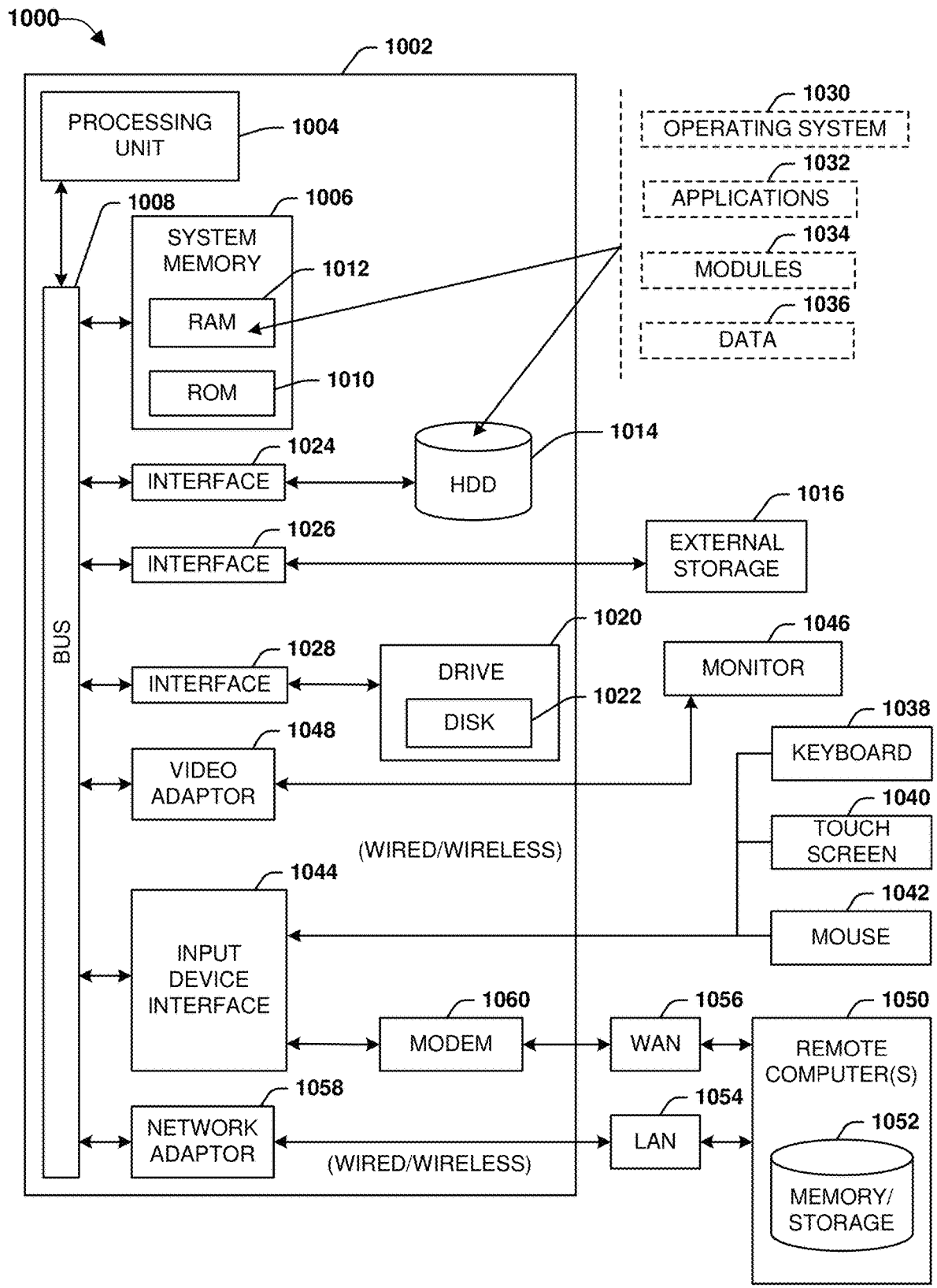
FIG. 10 illustrates an example block diagram of an example computer operable to engage in a system architecture that can facilitate processes described herein, in accordance with one or more embodiments.

FIG. 10 provides additional context for various embodiments described herein, intended to provide a brief, general description of a suitable operating environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per sc.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example operating environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and a drive 1020, e.g., such as a solid-state drive, an optical disk drive, which can read or write from a disk 1022, such as a CD-ROM disc, a DVD, a BD, etc. Alternatively, where a solid-state drive is involved, disk 1022 would not be included, unless separate. While the internal HDD 1014 is illustrated as located within the computer 1002, the internal HDD 1014 can also be configured for external use in a suitable chassis (not shown). Additionally, while not shown in environment 1000, a solid-state drive (SSD) could be used in addition to, or in place of, an HDD 1014. The HDD 1014, external storage device(s) 1016 and drive 1020 can be connected to the system bus 1008 by an HDD interface 1024, an external storage interface 1026 and a drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above, such as but not limited to a network virtual machine providing one or more aspects of storage or processing of information. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

Further to the description above, as it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine-readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. User equipment do not normally connect directly to the core networks of a large service provider, but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g., call transfer) or implicitly (e.g., call waiting). It is to be noted that service "execution" may or may not be a core network functionality as third-party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used, or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be affected across a plurality of devices. Accordingly, the embodiments are not to be limited to any single implementation, but rather are to be construed in breadth, spirit and scope in accordance with the appended claims.

What is claimed is:

1. A method, comprising:

receiving, via a communications network by routing controller equipment comprising a processor, altitude information corresponding to an altitude of a user equipment;

based on the altitude, generating, by the routing controller equipment, a signal limiting instruction applicable to limit a signal associated with the user equipment;

obtaining, by the routing controller equipment, location information associated with the user equipment;

determining, by the routing controller equipment, a list of bands based on the location information;

determining, by the routing controller equipment, a potentially interfering band from the list of bands based on historical usage utilizing an artificial intelligence (AI) model resulting in a determination, wherein the altitude being above a high-altitude threshold corresponds with the signal limiting instruction comprising a band muting instruction that causes the user equipment not to transmit the signal using the potentially interfering band, wherein the altitude being below the high-altitude threshold and above a medium-altitude threshold corresponds with the signal limiting instruction comprising an instruction that:
- permits transmission of the signal using the potentially interfering band, and
- alters the signal to limit a potential for interference caused by the signal using the potentially interfering band, and wherein the medium-altitude threshold is above ground level and below the high-altitude threshold; and based on the determination, facilitating, by the routing controller equipment, communicating the signal limiting instruction to alter the signal associated with the user equipment with respect to the potentially interfering band.

2. The method of claim 1, wherein communicating the signal limiting instruction comprises communicating the signal limiting instruction to the user equipment, and wherein, responsive to receiving the signal limiting instruction, the user equipment operates to limit a transmission of the signal associated with the user equipment.

3. The method of claim 1, wherein communicating the signal limiting instruction comprises communicating the signal limiting instruction to an access point of the communications network, and wherein, responsive to receiving the signal limiting instruction, the access point operates to limit a transmission of the signal associated with the user equipment.

4. The method of claim 1, wherein the signal limiting instruction comprises a band muting instruction that causes the user equipment not to transmit the signal using the potentially interfering band.

5. The method of claim 4, wherein the band muting instruction is based on the altitude being determined to be above the high-altitude threshold, the high-altitude threshold selected to identify the user equipment as being in an aircraft at a threshold high altitude.

6. The method of claim 1, wherein the potentially interfering band is identified as potentially interfering with operation of an aircraft.

7. The method of claim 1, further comprising:
based on the altitude and a velocity of the user equipment, determining, by the routing controller equipment, that the user equipment is located at the altitude in a structure.

8. The method of claim 1, further comprising:
based on the altitude and a velocity of the user equipment, determining, by the routing controller equipment, that the user equipment is located in an aircraft that is airborne.

9. The method of claim 7, further comprising:
based on the user equipment being determined to be airborne and the altitude being determined to be below the high-altitude threshold, determining that the user equipment is in an airborne aircraft traveling at a medium altitude, wherein, based on the user equipment being determined to be in the airborne aircraft traveling at the medium altitude, the signal limiting instruction comprises the instruction that:
permits transmission of the signal using the potentially interfering band, and
alters the signal to limit the potential for interference caused by the signal using the potentially interfering band.

10. The method of claim 9, wherein the instruction that limits the potential for interference comprises a power instruction that reduces a transmission power of the transmission of the signal using the potentially interfering band.

11. The method of claim 9, wherein the instruction that limits the potential for interference comprises an interval instruction that reduces a transmission time interval allocated to the user equipment for the transmission of the signal using the potentially interfering band.

12. The method of claim 9, wherein the instruction that limits the potential for interference comprises a size instruction that reduces a size of a physical resource block allocated for the transmission of the signal using the potentially interfering band.

13. The method of claim 1, wherein the altitude was identified based on an enhanced emergency call information procedure.

14. The method of claim 1, wherein the altitude was identified based on a measurement by a component of the user equipment.

15. A user equipment, comprising:
a processor; and
a memory that stores executable instructions that, when executed by the processor, facilitate performance of operations, comprising:
identifying an altitude of the user equipment,
determining a potentially interfering signal band from a list of signal bands based on historical usage utilizing an artificial intelligence (AI) model resulting in a determination;
identifying an instruction that is related to the potentially interfering signal band from the list of signal bands, wherein the list of signal bands is determined from location information associated with the user equipment, wherein the instruction was generated based on a determination, based on the altitude, that a signal of the potentially interfering signal band has at least a threshold likelihood of interfering with a modality of transport, and
based on the instruction, altering use of the potentially interfering signal band for transmission by the user equipment.

16. The user equipment of claim 15, wherein the instruction was generated by network equipment based on an estimate that the user equipment is traveling in an aircraft that is airborne, and wherein, based on the instruction, a degree of altering the use of the potentially interfering signal band is based on the altitude of the user equipment.

17. The user equipment of claim 15, wherein the operations further comprise:
generating the instruction to control a transmission resource of the user equipment to mitigate or eliminate potential interference based on the list of signal bands.

18. A non-transitory machine-readable medium, comprising executable instructions that, when executed by a processor of a controller device, facilitate performance of operations, comprising:
receiving enhanced emergency location information for a user device;
determining a list of bands based on the enhanced emergency location information;
determining a potentially interfering band from the list of bands based on historical usage utilizing an artificial intelligence (AI) model resulting in a determination;
based on the enhanced emergency location information and based on the determination, determining that the user device has a potential for interfering with an operation of an aircraft; and based on the potential for interfering, controlling the user device not to transmit an interfering signal using a specified band within the list of bands.

19. The non-transitory machine-readable medium of claim 18, wherein the enhanced emergency location information comprises an altitude of the user device from enhanced 911 information describing the user device.

20. The non-transitory machine-readable medium of claim 18, wherein the operations further comprise determining that a signal is not the interfering signal based on a determination that the signal was transmitted using the specified band at a lower transmission power.

* * * * *